Figure 1:
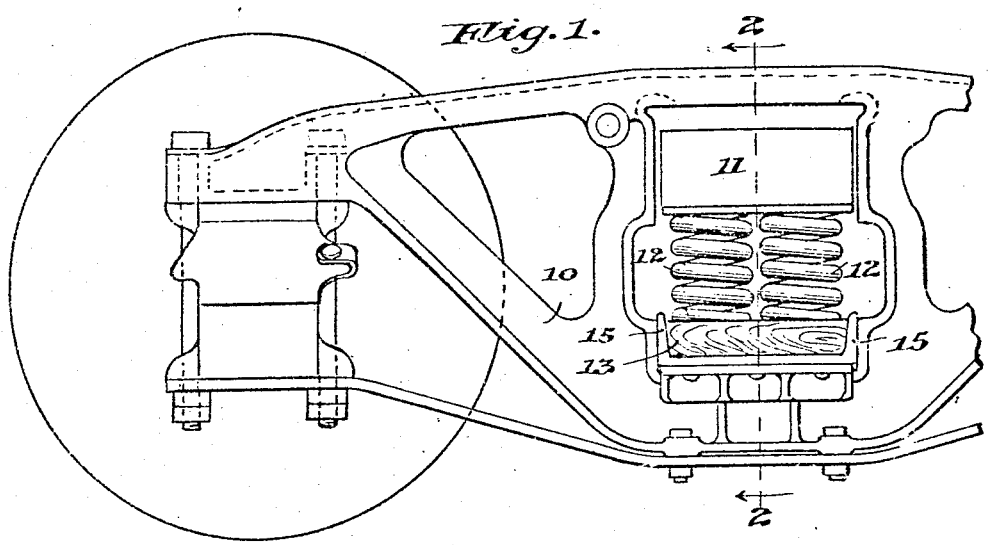

No. 877,495. PATENTED JAN. 28, 1908.
G. G. FLOYD.
SPRING PLANK SEAT FOR CAR TRUCKS.
APPLICATION FILED NOV. 22, 1906.

2 SHEETS—SHEET 1.

Witnesses:
E. B. Mann
Walter M. Fuller

Inventor:
George G. Floyd
By Offield, Towle & Linthicum
Att'ys.

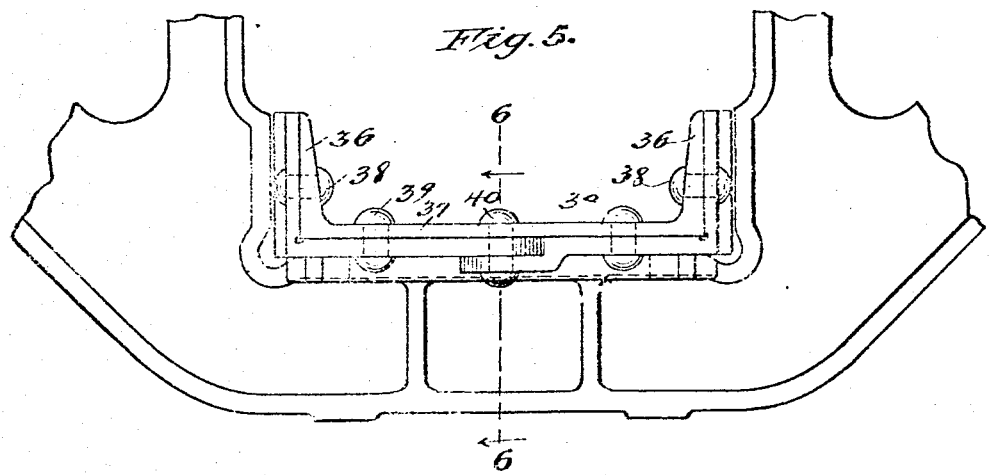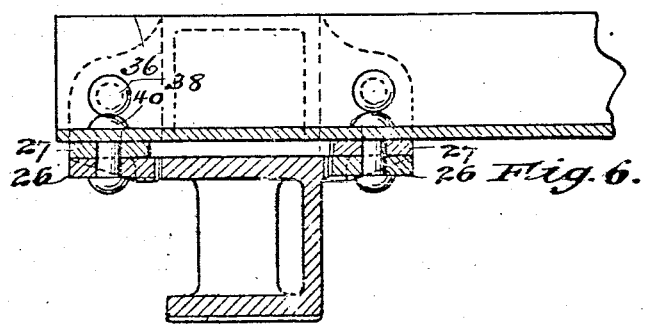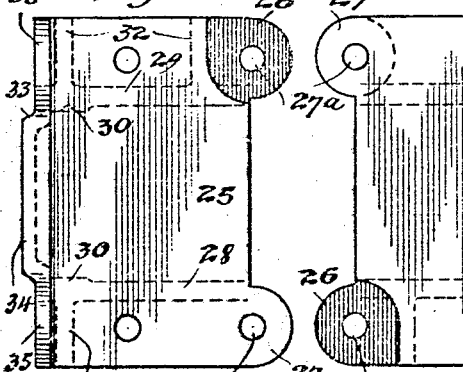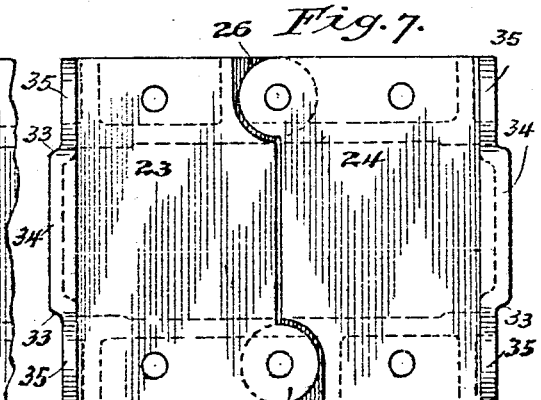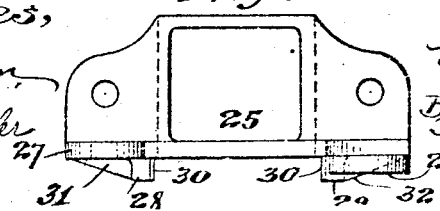

UNITED STATES PATENT OFFICE.

GEORGE G. FLOYD, OF GRANITE, ILLINOIS, ASSIGNOR TO AMERICAN STEEL FOUNDRIES, OF NEW YORK, N. Y., A CORPORATION OF NEW JERSEY.

SPRING-PLANK SEAT FOR CAR-TRUCKS.

No. 877,495.

Specification of Letters Patent.

Patented Jan. 28, 1908.

Application filed November 22, 1906. Serial No. 344,621.

*To all whom it may concern:*

Be it known that I, GEORGE G. FLOYD, a citizen of the United States, residing at Granite, in the county of Madison and State of Illinois, have invented certain new and useful Improvements in Spring-Plank Seats for Car-Trucks, of which the following is a specification.

My invention concerns improved means for securing the ends of a spring plank in a railway car truck to the side frames in order to maintain the plank in proper position.

Heretofore it has been customary to use a channel spring plank and rivet its web and upstanding flanges directly to the truck side frames, but difficulty has been encountered in riveting the flanges owing to the fact that the width of the opening in the side frame through which the spring plank projects varies in different castings although made from the same pattern. I intend to use a spring plank seat or saddle which straddles the side frame or at least overlaps a portion thereof whereby after the plank has been riveted or otherwise fastened to the two saddles or seats at opposite sides of the truck longitudinal shifting of the plank is prevented.

In one embodiment of my invention the seat or saddle has no ears or flanges to which to secure the flanges of the channel plank while in another embodiment the seat has such ears or ribs and is divided into two parts whereby the space between its ears or flanges may be made to correspond to the distance between the outer surfaces of the plank's flanges. This division of the seat or saddle into parts is necessary because of the difficulty in casting such seats wherein the width between its flanges exactly equals that between the exterior surfaces of the spring plank flanges.

In the accompanying drawings I have illustrated two desirable embodiments of my invention and on said drawings like reference characters refer to the same parts throughout all the views.

Figure 2:
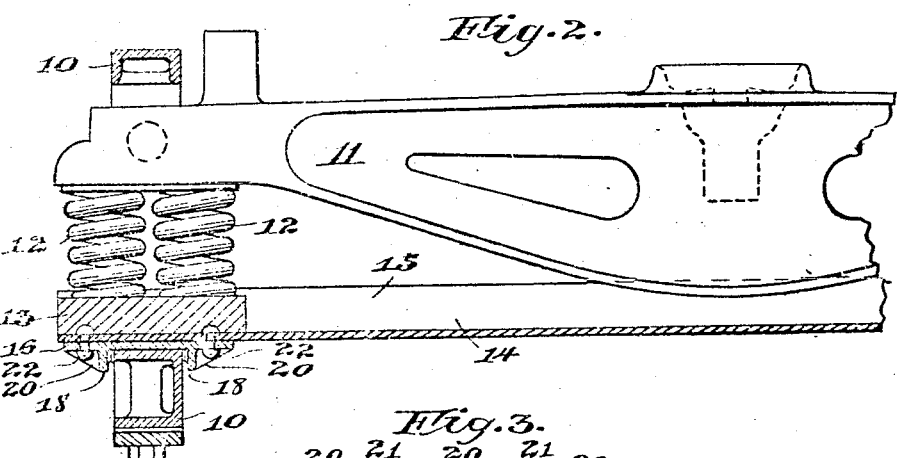
Figure 3:
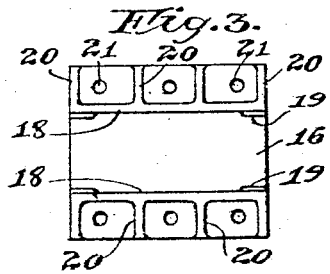
Figure 4:
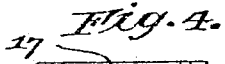

Figure 1 is a fragmentary side elevation of a car truck equipped with one style or form of my improved spring plank seats; Fig. 2 is a vertical section through the truck on line 2—2 of Fig. 1, the bolster being illustrated unsectioned; Fig. 3 is a bottom plan view of my new form of seat; Fig. 4 is an end or edge elevation of the seat shown in Fig. 3; Fig. 5 shows a fragment of a car truck side frame and a channel spring plank equipped with a modified form of seat; Fig. 6 is a vertical section on line 6—6 of Fig. 5; Fig. 7 is a top plan view of the spring seat shown in Figs. 5 and 6; Fig. 8 is a plan similar to that of Fig. 7 showing the two parts of the seat separated, one of the parts being also partially broken away; and Fig. 9 is an elevation of the right hand end of the left hand half of the spring seat illustrated in Fig. 8.

The car truck shown in Figs. 1 and 2 has the usual side frame 10, bolster 11, springs 12, bolster spring seat 13, and the channel spring plank 14 having the pair of upwardly extended parallel flanges 15. Instead of riveting or otherwise securing the web and flanges of spring plank 14 directly to the side frame I employ for each end of the spring plank a seat or saddle 16 having the flat top or plate portion 17 with longitudinal parallel spaced ribs 18 on its under surface. Bearing surfaces 19 are provided at its ends on the inner surfaces of flanges of ribs 18, the latter being braced and held in place by a number of integral bracket ribs 20. Preferably the entire spring plank seat is cast in one piece and is provided between ribs 20 with holes or apertures 21 adapted to accommodate rivets 22 which fasten the web of the spring plank to the top surface of the seat or saddle. When the spring plank and its seat are in proper position in the car truck ribs 18, their bearing surfaces 19 overlap the opposite sides of that portion of the side frame beneath the spring plank, as is clearly shown in Fig. 2. Longitudinal or endwise shifting of the spring plank is prevented by the ribs 18 engaging by means of their bearing surfaces 19 with the sides of the frame, as will be readily understood. The spring plank and its seats may be removed from the truck with facility by first taking out springs 12 and then lifting the spring plank so that the ribs 18 escape the side frame, and, when in this position, the spring plank and its seats may be drawn through the aperture of the side frame. Although I have shown my spring plank seat or saddle as having two ribs 18 it will be readily understood that the spring plank can be maintained in position in the truck by a pair of such seats on opposite sides of the truck each having but a single rib which may lie adjacent to either the inner or the outer surface of the frame.

In Figs. 5 to 9, inclusive, I have illustrated a modified form of spring plank seat which is adapted to be riveted not only to the web of the channel spring plank but also to its flanges. Since it is difficult if not well nigh impossible to cast a one-piece seat in which the upwardly projecting flanges or ears are spaced apart an amount to correspond exactly to the distance apart of the flanges of the spring plank, I have devised the form of seat or support shown in this latter group of figures of the drawing, the seat being made of two parts which may be adjusted to provide the correct distance between the upstanding flanges. This seat or saddle is composed of the two parts 23 and 24 which are exactly alike and for that reason may be cast from the same pattern. Each part or section comprises a flat portion or base 25 having at one corner a depressed ear or lug 26 and at the other corner at the same end an ear 27 in substantially the same plane as the plate portion 25.

Along the under surface of each part of the seat and integral therewith is a pair of ribs 28 and 29. These ribs are parallel, are spaced apart an amount approximately equal to the thickness of the side frame of the truck, and have on their inner faces the bearing surfaces 30. To strengthen the structure and securely hold these ribs in place under working conditions rib 28 has a brace or bracket 31 integral with the seat while the rib 29 has two such brackets 32. Rising from the end of each half of the seat opposite to the end equipped with the ears 26 and 27 is a flange 33 having a central outwardly-bowed part 34 and apertured ends 35 adapted to be fastened to the flanges 36 of a channel spring plank 37 by means of rivets 38. To assemble the two parts 23 and 24 to form a spring plank seat they are brought together so that the rounded ear 27 of each overlaps the similar depressed ear 26 of the other. The two parts are then positioned so that the distance between the end portions 35 of flanges 33 will exactly equal the distance between the outer faces of flanges 36. When thus assembled holes 27ª are drilled through ears 26 and 27 and the seat is then fastened to the end of the channel spring plank by means of rivets 39 and 40 which secure the seat to the web of the plank, and the rivets 40 each passing through the apertures 27ª of a pair of ears 26 and 27. As explained above other rivets 38 fasten the flanges 33 to the flanges of the spring plank.

When the plank and seat are in proper position on the side frame of the truck, as shown in Figs. 5 and 6, the downwardly projecting ribs 28 and 29 overlap the inner and outer surfaces of the side frame thereby preventing lengthwise movement of the spring plank.

To remove the plank and seats from the truck it is merely necessary to raise the same so that they may be drawn through the central aperture of the frame without the rivets 28 and 29 interfering with the walls of the aperture. It should be noted that the parts 34 lie adjacent to or against these vertical walls of the central aperture of the side frame, and that the parts 35 are offset inwardly sufficiently so that the outer heads of the rivets 38 do not strike the sides or walls of the aperture when the plank and its seat is being withdrawn or inserted. This construction of seat permits the two parts 23 and 24 to be separated or brought together more or less closely whereby the seat and flanges or ribs may be brought squarely against the outer faces of the plank's flanges. I have illustrated and described this second form of spring seat as having two parallel flanges adapted to coöperate with the two faces or surfaces of the side frame to maintain the spring plank in proper position and prevent lengthwise shifting thereof, but it will be readily understood that since one of these seats is riveted to each end of the spring plank seats with only one depending rib would operate satisfactorily.

I have described the details of the two forms of seats or saddles, but it will be readily understood by those skilled in the art and by the scope of the appended claims that my invention is not limited to the precise structural details shown and that the seats may be varied in mechanical form to a considerable extent without departure from the substance of my invention.

I claim:

1. In a railway car truck, the combination of a truck side frame, a spring plank, and a spring plank seat coöperating with said side frame, adapted to be fastened to said spring plank, and composed of two or more parts upon which said spring plank rests, substantially as described.

2. In a railway car truck, the combination of a truck side frame, a spring plank, and a spring plank seat adapted to be fastened to said spring plank and composed of two or more parts upon which said spring plank rests, said spring plank seat having one or more ribs co-acting with said side frame to prevent displacement of said seat, substantially as described.

3. In a railway car truck, the combination of a truck side frame, a spring plank, and a spring plank seat upon which said spring plank rests, said seat having one or more ribs co-acting with said side frame to prevent displacement of said seat, and also having one or more upstanding ribs or flanges, said spring plank being fastened to said seat and to said ribs or flanges, substantially as described.

4. In a railway car truck, the combination of a truck side frame, a channel spring plank, and a spring plank seat upon which the web of said channel spring plank rests, said seat having one or more ribs co-acting with said side frame to prevent displacement of said seat, and also having a pair of upstanding ribs or flanges, the flanges of said channel spring plank being riveted to the upstanding ribs or flanges of said seat, substantially as described.

5. A spring plank seat for use in a car truck composed of a plurality of parts each of which has a portion adapted to overlap a part of the other, substantially as described.

6. A spring plank seat for use in a car truck composed of a plurality of overlapping parts, substantially as described.

7. A spring plank seat for use in a car truck composed of a plurality of parts each of which has an upstanding rib or flange, and an ear adapted to overlap an ear of the other part, substantially as described.

8. A spring plank seat for use in a car truck composed of a pair of parts each of which has an upstanding rib or flange adapted to be riveted to a flange of a channel spring plank, and a pair of ribs adapted to straddle the side frame of the car truck, each of said parts also having an ear adapted to overlie a similar ear on the other part whereby the distance between said upstanding ribs or flanges may be made to correspond to the width of the spring plank without complete separation of the parts forming said spring plank seat, substantially as described.

9. A spring plank seat for use in a car truck having a flat plate portion on which the web of a channel spring plank is adapted to rest, and having also a pair of upstanding ribs or flanges each of which has a part adapted to lie adjacent to or in contact with an upright wall of the aperture in the truck side frame in which the spring plank is adapted to rest and one or more parts offset with respect to said first mentioned part and adapted to be riveted to the adjacent flange of the channel spring plank, whereby said seat may extend substantially the full width of said aperture and be drawn through the same without interference by the heads of the rivets fastening the spring plank flanges to the seat, substantially as described.

10. In a railway car-truck, the combination of a truck side-frame, a removable spring-plank, and a spring-plank seat fastened to and removable with said spring-plank and having one or more ribs adapted to co-act with a portion of said side-frame to prevent longitudinal shifting of said spring-plank, substantially as described.

11. In a railway car-truck, the combination of a truck side-frame, a removable spring-plank, and a spring-plank seat or saddle fastened to and removable with said spring-plank and having on its under surface a pair of spaced ribs overlapping a portion of said side-frame and co-acting therewith to prevent lengthwise shifting of said spring-plank, substantially as described.

12. In a railway car-truck, the combination of a truck side-frame, a removable spring-plank, and a two-part spring-plank seat or saddle fastened to and removable with said spring-plank and having on its under surface one or more ribs coöperating with said side-frame to prevent lengthwise shifting of said spring-plank, the parts of said seat or saddle being adjustable to the width of the spring-plank before being fastened thereto, substantially as described.

GEORGE G. FLOYD.

Witnesses:
H. H. WILLOUGHBY,
G. E. WHITTEN.